Figure 1:
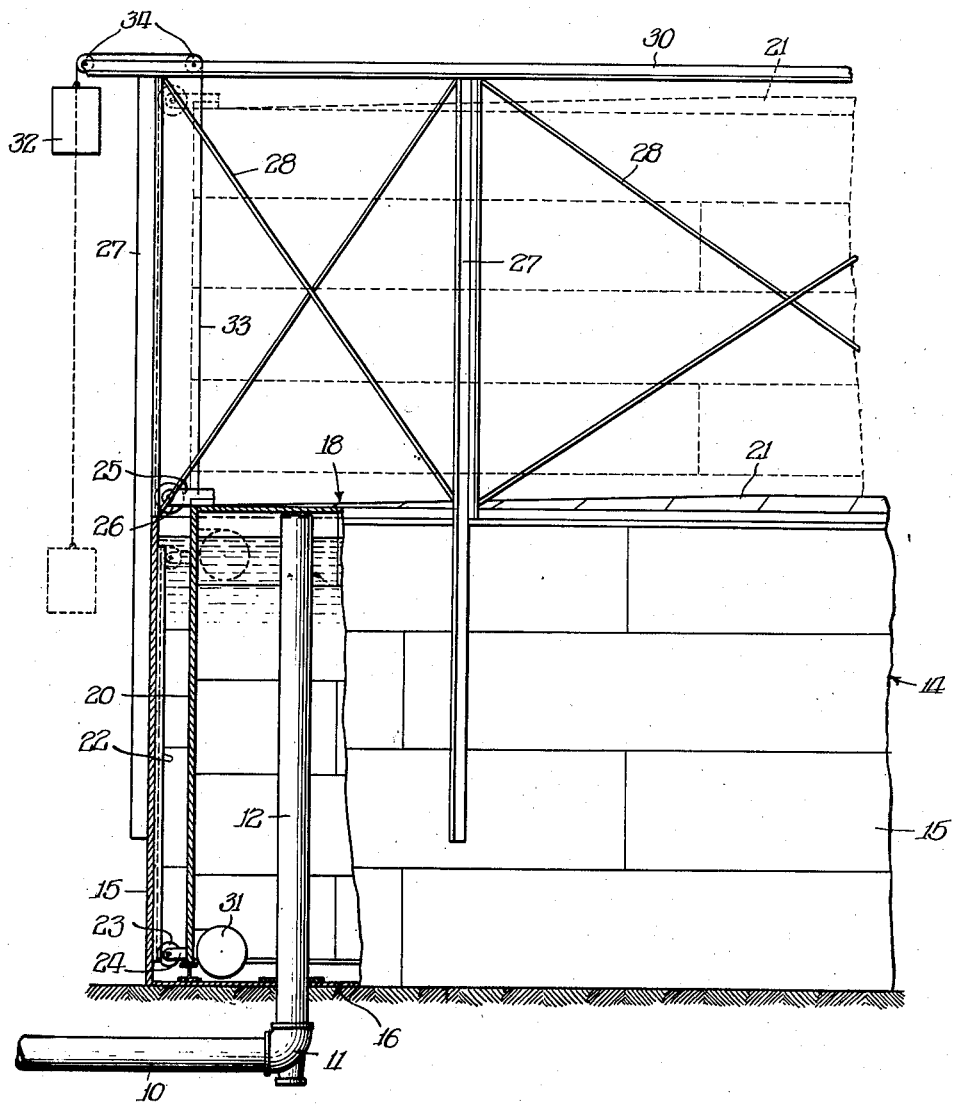

June 20, 1939.  L. A. WILKIN  2,163,076

WATER SEALED GAS HOLDER

Filed May 24, 1937  2 Sheets-Sheet 2

Inventor:
Lester A. Wilkin,
By Wilkinson Huxley Byron & Knight
Attys.

Patented June 20, 1939

2,163,076

UNITED STATES PATENT OFFICE 2,163,076

WATER SEALED GAS HOLDER

Lester A. Wilkin, East Chicago, Ind., assignor to Graver Tank & Mfg. Co., Inc., Catasauqua, Pa., a corporation of Delaware Application May 24, 1937, Serial No. 144,444

1 Claim. (Cl. 48—176)

The invention relates to an improved breather reservoir for storage tanks to prevent loss by evaporation of the volatile liquid stored in the tank. More particularly, the invention relates to a breather reservoir of the gas holder type adapted to have connection with a plurality of storage tanks for receiving and temporarily storing the excess vapors from said tanks.

It is well known that severe evaporation losses have been entailed during the storing of volatile liquids such as gasoline and the like in large storage tanks since what is known as breathing caused by changes in temperature takes place. Since it is not economical to permit the vapors resulting from the heat during the day to exhaust into the atmosphere many attempts have been made to save the vapors so that they may be condensed during relatively cool periods. Thus breather roofs and breather bags have been provided for this purpose. The present invention is an improvement on the latter and has for its primary object to provide a gas holder type of breather reservoir that can be connected to the vent outlets of a plurality of storage tanks to take care of the breathing of said tanks and which will not discharge any vapors to the atmosphere so that loss by evaporation will not occur.

Another object is to provide a gas holder type of breather reservoir which will be counter-balanced and which will therefore operate at a pressure that can be adjusted to suit the strength and also the weight of the roofs of the tanks which it serves.

A more specific object is to provide a holder bell for the purposes described which will make use of floats and counter-weights so that the holder will rise when the vapor pressure within is approximately one ounce per square inch. It is necessary that the holder operate at this extremely low pressure since most storage tanks will not stand pressures very much greater.

Another object of the invention resides in the provision of a breather reservoir of the gas holder type having means for compensating the loss in the buoyant effect of the holder as a result of movement upwardly thereof. By compensating for the decreasing buoyant effect of the holder as the same moves upwardly out of the sealing liquid in the tank a holder is provided which will operate at a uniform pressure for the full extent of its movement.

With these and various other objects in view, the invention may consist of certain novel features of construction and operation as will be more fully described and particularly pointed out in the specification, drawings and claim appended hereto.

In the drawings which illustrate an embodiment of the invention and wherein like reference characters are used to designate like parts—

Figure 2:
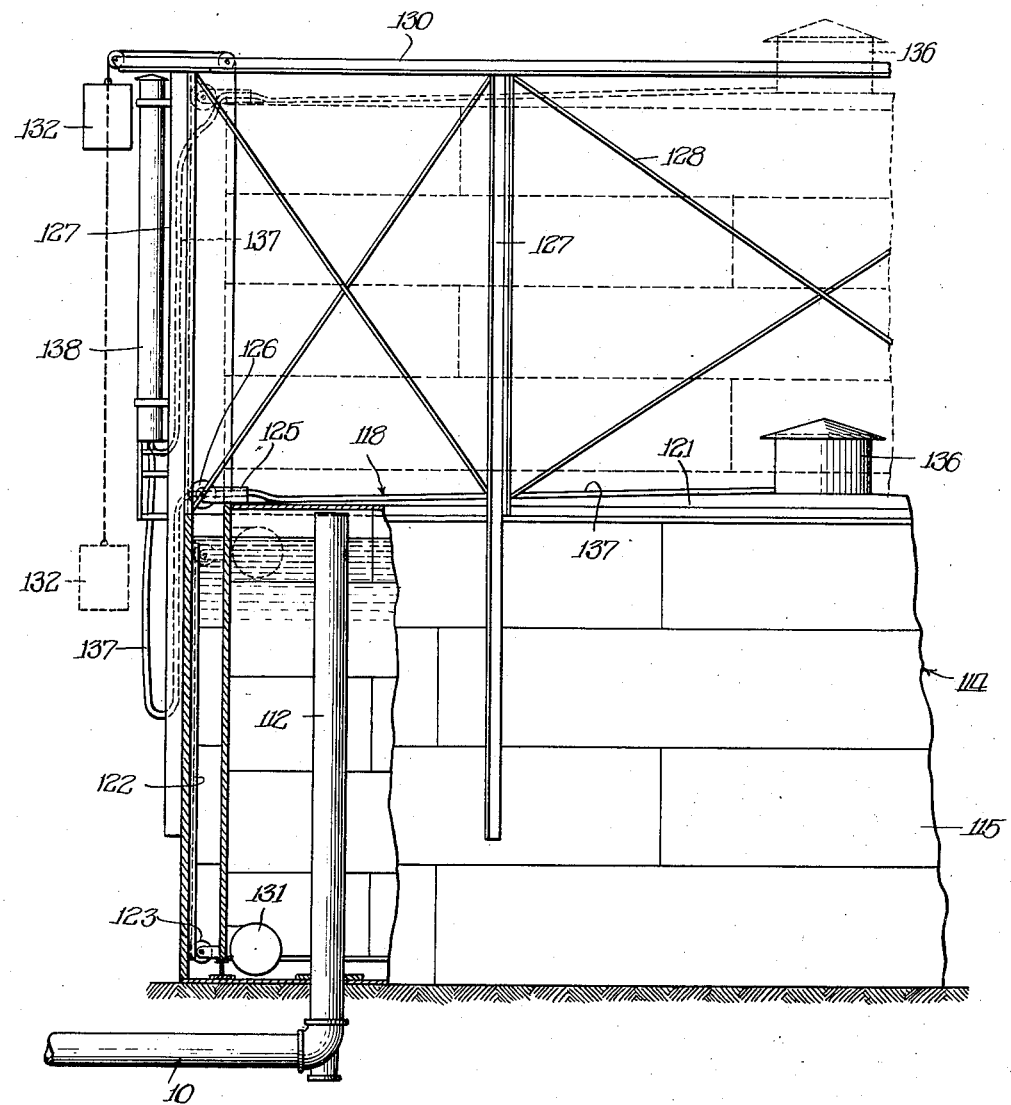

Figure 1 is a fragmentary elevational view, parts being shown in section, of the gas holder type of breather reservoir comprising the invention; and Figure 2 is a fragmentary elevational view, parts being shown in section, of the gas holder type of breather reservoir such as shown in Figure 1, having a compensating device applied thereto.

The breather reservoir of the invention is adapted to serve a plurality of storage tanks which may store gasoline, naphtha or other volatile liquids. The storage tanks are suitably connected at the vent outlet provided in the roof thereof by a relatively large conduit which in turn has connection with a main conduit indicated in Figures 1 and 2 by numeral 10, the same having elbow 11 which joins with an upright portion 12. Said upright portion extends within the tank indicated in its entirety by numeral 14 and thus discharges into the breather reservoir the vapors from the several storage tanks. The tank 14 consists of cylindrical side walls 15 and a bottom member 16. Said tank is adapted to contain a liquid which will form a seal with the holder bell 18 to be presently described. When the breather reservoir is located in warm climates water may be used as a sealing liquid all the year but in the colder climates gas oil or other low volatile liquid having a lower freezing temperature than water will be preferred especially in the winter time.

The holder bell 18 comprises an open bottom tank of somewhat smaller diameter than tank 14. Accordingly, the side walls 20 of the holder will be spaced some distance inwardly of the walls 15 of the tank 14 containing the sealing liquid. A cover 21 completes the holder. Since the holder bell is adapted to have vertical movement with respect to tank 14, means are provided for facilitating said movement which likewise will maintain the holder properly centered throughout the extent of said movement. Said means consists of members 22 suitably secured to the inside of the walls 15 of tank 14. The said members are suitably spaced around said tank walls and may have a shape in cross section such as will provide a groove for receiving and guiding the rollers 23 journalled by projections 24 suitably secured to the side walls 20 of the holder at the lower end thereof. At the upper end of the holder projections 25 journal rollers 26 which are guided by the guide members 27 suitably secured in spaced relation to the exterior of the tank 14 and projecting a distance above the top of said tank which may approximately equal the height of the holder. The said guide members 27 may also have a cross sectional shape such as will provide a groove for receiving and guiding the rollers 26 during the raising and lowering movements of the holder bell. Said guide members are suitably braced by the rods 28, and are connected at their upper ends by the circular angle member 30.

Since the gasoline storage tanks which the present breather reservoir is designed to serve will not withstand a vapor pressure much in excess of one ounce per square inch, it is necessary that the holder of the said reservoir have upward movement when the average pressure of the several storage tanks connecting therewith approximate this rather low pressure. To adapt the present holder to an operating pressure as low as one ounce per square inch the invention contemplates counter-balancing means in the form of floats 31 attached to the lower end of the holder bell and counter-balancing weights 32 having connection with the top of the holder. The floats are of a size and number to suit the particular installation and are suitably secured, preferably by welding, to the interior of a holder at the base thereof. The counter-balancing weights 32 are joined by cables 33 which pass over pulleys 34 with the top of the holder.

In operation the buoyant effect of the floats 31 is augmented by the counter-balancing weights 32. By an adjustment of the weights a wide range of operating pressures for the holder bell can be secured which however for the present purposes will approximate one ounce per square inch.

In the modification of Figure 2 the tank 114 having side walls 115 contains the sealing liquid into which is immersed the holder bell 118. The rollers 123 at the base of the holder bell and rollers 126 at the upper end thereof engage the guiding means 122 and 127, respectively, which thereby facilitate the vertical movements of the holder bell and also maintain the same properly centered throughout the extent of its movement.

It will be observed that the holder bell is buoyed upwardly by a force which is equal to the weight of the liquid displaced by the metal forming the side walls of the holder bell which is immersed in said liquid. As the holder bell moves upwardly this buoyant force gradually diminishes due to the fact that the holder is gradually lifted out of the liquid. Therefore the holder bell has its greatest apparent weight when located in extreme raised position since when in this position the walls of the holder immersed in the sealing liquid is a minimum and thus the buoying effect is a minimum.

As a result of this diminishing buoyant effect on the holder bell as the same travels upward the breather reservoir would operate, were it not for the compensating feature of the invention, at a pressure which would be non-uniform. In other words, if the holder bell would rise at a pressure of one ounce, the pressure when the holder reached its uppermost position would be considerably greater than one ounce. For practical reasons, this is not desirable and therefore the invention contemplates the provision of compensating means which will lighten the holder bell in a gradual manner as the same travels upwardly to thereby compensate for the decrease in the buoyant effect above described.

The holder bell 118, having the roof 121, is provided with one or more tanks 136 for containing water or other liquid. Each of the tanks 136 is connected by a hose 137 suitably supported at the periphery of the holder bell by the projections 125. The hose is flexible and therefore a length of the same depends in a loop from the extensions 125 on the outside of the tank 114. The upper end of said hose is connected to a container 138 suitably supported in vertical position by a guide member 127. The volume of the tank 136 is approximately equal to that of the container 138 and it will be noted that the container terminates in a horizontal plane approximately coinciding with the top of the tank 136, Figure 2, so that said container is above said tank when the holder is in deflated position.

In operation of the breather reservoir having the floats 131 and counter-balancing weights 132, and which is equipped with the compensating device above described, the holder bell will rise when the average vapor pressure from the several storage tanks connecting with the breather reservoir approximates the operating pressure of the holder bell. This, as previously described, may be adjusted to suit conditions and for the present requirements the holder will rise when said vapor pressure approximates one ounce per square inch. Upon upward movement of the holder bell the liquid in the tank 136 will flow as a result of gravity into the container 138. The weight of the holder bell therefore gradually decreases to compensate for the decrease in the buoyant force caused by the holder being lifted out of the sealing liquid. When the holder bell reaches its uppermost position all the liquid will have drained from tank 136 into container 138 and thus the holder bell is lightest when in this position. However, the extent to which the side walls of the holder bell are immersed in the liquid in tank 114 is a minimum when the holder is in its uppermost position and thus the buoying effect is a minimum. As a result of the compensating device the holder bell will operate at a pressure which is substantially uniform throughout the extent of its movement.

The invention is not to be limited to or by details of construction of the particular embodiment thereof illustrated in the drawings, as various other forms of the device will of course be apparent to those skilled in the art without departing from the spirit of the invention or the scope of the claim.

What is claimed is:

In a gas holder, a tank containing a sealing liquid, an inverted holder bell adapted to have vertical movement with respect to said tank, said holder bell having a portion of the side walls thereof immersed in said liquid forming a seal therefor, guiding means provided by said tank for guiding and controlling the vertical movements of said holder bell, counter-balancing means for counter-balancing the weight of said holder bell including floats secured to the lower end of said holder bell and a plurality of adjustable weights connecting with the top thereof, and means compensating for the gradual decrease in the buoyant effect of the liquid on said holder bell as the same moves upwardly, whereby said holder bell will have uniform operating pressure throughout the extent of its movement, said compensating means comprising a liquid container supported by the holder bell and by said guiding means respectively, and a flexible hose connecting said containers.

LESTER A. WILKIN.